(12) United States Patent
Xu et al.

(10) Patent No.: US 8,547,336 B1
(45) Date of Patent: Oct. 1, 2013

(54) CIRCUIT AND METHOD FOR DETERMINING MOTION WITH REDUNDANT COMB-ARRAYS

(75) Inventors: Yansun Xu, Mountain View, CA (US); Brian Todoroff, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 76 days.

(21) Appl. No.: 13/023,533

(22) Filed: Feb. 8, 2011

Related U.S. Application Data

(63) Continuation of application No. 11/355,551, filed on Feb. 16, 2006, now Pat. No. 7,884,801.

(51) Int. Cl.
*G06F 3/033* (2013.01)

(52) U.S. Cl.
USPC .......................................... 345/166; 250/205

(58) Field of Classification Search
USPC ..................... 345/156–167; 250/208.1–216
See application file for complete search history.

(56) References Cited

U.S. PATENT DOCUMENTS

| | | | |
|---|---|---|---|
| 3,922,093 A | 11/1975 | Dandliker et al. | |
| 4,282,468 A * | 8/1981 | Barker et al. | 318/608 |
| 4,546,347 A | 10/1985 | Kirsch | |
| 4,799,055 A | 1/1989 | Nestler et al. | |
| 5,086,197 A | 2/1992 | Liou | |
| 5,288,993 A | 2/1994 | Bidiville et al. | |
| 5,345,527 A | 9/1994 | Lebby et al. | |
| 5,473,344 A | 12/1995 | Bacon et al. | |
| 5,578,813 A | 11/1996 | Allen et al. | |
| 5,606,174 A | 2/1997 | Yoshimura et al. | |
| 5,644,139 A | 7/1997 | Allen et al. | |
| D382,550 S | 8/1997 | Kaneko et al. | |
| D385,542 S | 10/1997 | Kaneko et al. | |
| 5,703,356 A | 12/1997 | Bidiville et al. | |
| 5,729,008 A | 3/1998 | Blalock et al. | |
| 5,729,009 A | 3/1998 | Daendliker et al. | |
| 5,781,229 A | 7/1998 | Zediker et al. | |
| 5,786,804 A | 7/1998 | Gordon | |
| 5,825,044 A | 10/1998 | Allen et al. | |
| 5,854,482 A | 12/1998 | Bidiville et al. | |
| 5,907,152 A | 5/1999 | Daendliker et al. | |
| 5,963,197 A | 10/1999 | Bacon et al. | |
| 5,994,710 A | 11/1999 | Knee et al. | |
| 6,031,218 A * | 2/2000 | Piot et al. | 250/208.2 |
| 6,037,643 A | 3/2000 | Knee | |

(Continued)

OTHER PUBLICATIONS

Ogiwara et al., "A Speckle Pattern Velocimeter Using a Periodical Differential Detector," Japanese Journal of Applied Physics, vol. 14, 1975 published, ICO Conference of Optical Methods in Scientific and Industrial Measurements, Tokyo in 1974, pp. 307-310; 4 pages.

(Continued)

*Primary Examiner* — Amare Mengistu
*Assistant Examiner* — Vinh Lam

(57) ABSTRACT

An optical navigation system and method are provided. In one embodiment, the method includes: (i) generating for a first group of photosensitive elements a first quasi-sinusoidal signal at a first time, and a second quasi-sinusoidal signal at a second time in response to motion of light received thereon in a first direction; (ii) computing from the first and second quasi-sinusoidal signals a phase angle change; and (iii) computing from the first and second quasi-sinusoidal signals a radius value. Other embodiments are also described.

9 Claims, 8 Drawing Sheets

(56) References Cited

U.S. PATENT DOCUMENTS

| | | | |
|---|---|---|---|
| 6,057,540 A | 5/2000 | Gordon et al. | |
| 6,097,371 A | 8/2000 | Siddiqui et al. | |
| 6,151,015 A | 11/2000 | Badyal et al. | |
| 6,172,354 B1 | 1/2001 | Adan et al. | |
| 6,225,617 B1* | 5/2001 | Dandliker et al. | 250/208.2 |
| 6,233,368 B1 | 5/2001 | Badyal et al. | |
| 6,281,881 B1 | 8/2001 | Siddiqui et al. | |
| 6,281,882 B1 | 8/2001 | Gordon et al. | |
| 6,326,950 B1 | 12/2001 | Liu | |
| 6,330,057 B1 | 12/2001 | Lederer et al. | |
| 6,351,257 B1 | 2/2002 | Liu | |
| 6,396,479 B2 | 5/2002 | Gordon | |
| 6,421,045 B1 | 7/2002 | Venkat et al. | |
| 6,424,407 B1 | 7/2002 | Kinrot et al. | |
| 6,433,780 B1 | 8/2002 | Gordon et al. | |
| 6,452,683 B1 | 9/2002 | Kinrot et al. | |
| 6,455,840 B1 | 9/2002 | Oliver et al. | |
| D464,352 S | 10/2002 | Kerestegian | |
| 6,462,330 B1 | 10/2002 | Venkat et al. | |
| 6,476,970 B1 | 11/2002 | Smith | |
| 6,529,184 B1 | 3/2003 | Julienne | |
| 6,585,158 B2 | 7/2003 | Norskog | |
| 6,603,111 B2 | 8/2003 | Dietz et al. | |
| 6,608,585 B2 | 8/2003 | Benitz | |
| 6,621,483 B2 | 9/2003 | Wallace et al. | |
| 6,642,506 B1 | 11/2003 | Nahum et al. | |
| 6,657,184 B2 | 12/2003 | Anderson et al. | |
| 6,664,948 B2 | 12/2003 | Crane et al. | |
| 6,674,475 B1 | 1/2004 | Anderson | |
| 6,677,929 B2 | 1/2004 | Gordon et al. | |
| 6,703,599 B1 | 3/2004 | Casebolt et al. | |
| 6,737,636 B2 | 5/2004 | Dietz et al. | |
| 6,741,335 B2 | 5/2004 | Kinrot et al. | |
| 6,774,351 B2 | 8/2004 | Black | |
| 6,774,915 B2 | 8/2004 | Rensberger | |
| 6,795,056 B2 | 9/2004 | Norskog et al. | |
| 6,809,403 B2 | 10/2004 | Gee | |
| 6,809,723 B2 | 10/2004 | Davis | |
| 6,819,314 B2 | 11/2004 | Black | |
| 6,823,077 B2 | 11/2004 | Dietz et al. | |
| 6,950,094 B2 | 9/2005 | Gordon et al. | |
| 6,963,059 B2 | 11/2005 | Lauffenburger et al. | |
| 6,967,321 B2 | 11/2005 | Leong et al. | |
| 6,977,645 B2 | 12/2005 | Brosnan | |
| 7,019,733 B2 | 3/2006 | Koay | |
| 7,045,763 B2 | 5/2006 | Ballard | |
| 7,102,317 B2* | 9/2006 | Chun | 318/637 |
| 7,110,100 B2 | 9/2006 | Buermann et al. | |
| 7,116,427 B2 | 10/2006 | Baney et al. | |
| 7,119,323 B1 | 10/2006 | Brosnan et al. | |
| 7,126,585 B2 | 10/2006 | Davis et al. | |
| 7,138,620 B2 | 11/2006 | Trisnadi et al. | |
| 7,161,682 B2 | 1/2007 | Xie et al. | |
| 7,248,345 B2 | 7/2007 | Todoroff et al. | |
| 7,285,766 B2 | 10/2007 | Carlisle et al. | |
| 7,321,359 B2 | 1/2008 | Xie et al. | |
| 7,405,389 B2* | 7/2008 | Dueweke et al. | 250/221 |
| 7,646,373 B2* | 1/2010 | Hunter et al. | 345/166 |
| 7,884,801 B1* | 2/2011 | Xu et al. | 345/166 |
| 2003/0058506 A1 | 3/2003 | Green et al. | |
| 2005/0083303 A1 | 4/2005 | Schroeder et al. | |
| 2008/0221711 A1 | 9/2008 | Trainer | |

OTHER PUBLICATIONS

R E. Kalman, "A New Approach to Linear Filtering and Prediction Problems," Transactions of the ASME—Journal of Basic Engineering, Copyright 1960, Research Institute for Advanced Study; Baltimore, MD; 12 pages.

Schnell et al., "Detection of Movement with Laser Speckle Patterns: Statistical Properties," Journal of the Optical Society of America A (JOSA A), vol. 15, Issue 1, 1998, pp. 207-216; 10 pages.

USPTO Advisory Action for U.S. Appl. No. 11/355,551 dated Feb. 1, 2010; 3 pages.

USPTO Final Rejection for U.S. Appl. No. 11/355,551 dated Nov. 18, 2009; 16 pages.

USPTO Non-Final Rejection for U.S. Appl. No. 11/129,967 dated Dec. 6, 2006; 8 pages.

USPTO Non-Final Rejection for U.S. Appl. No. 11/261,316 dated Jun. 6, 2006; 6 pages.

USPTO Non-Final Rejection for U.S. Appl. No. 11/355,551 dated May 16, 2009; 16 pages.

USPTO Notice of Allowance for U.S. Appl. No. 11/129,967 dated Aug. 6, 2007; 4 pages.

USPTO Notice of Allowance for U.S. Appl. No. 11/261,316 dated Aug. 23, 2006; 6 pages.

USPTO Notice of Allowance for U.S. Appl. No. 11/268,698 dated Apr. 19, 2007; 9 pages.

USPTO Notice of Allowance for U.S. Appl. No. 11/355,551 dated Apr. 29, 2010; 4 pages.

USPTO Notice of Allowance for U.S. Appl. No. 11/355,551 dated Sep. 28, 2010; 4 pages.

USPTO Requirement for Restriction/Election for U.S. Appl. No. 11/355,551 dated Feb. 12, 2009; 6 pages.

USPTO Non-Final Rejection for U.S. Appl. No. 11/355,551 dated May 18, 2009; 16 pages.

USPTO Requirement for Restriction for U.S. Appl. No. 11/355,551 dated Feb. 12, 2009; 6 pages.

* cited by examiner

CIRCUIT AND METHOD FOR DETERMINING MOTION WITH REDUNDANT COMB-ARRAYS

RELATED APPLICATIONS

This application claims priority to U.S. Non-Provisional application Ser. No. 11/355,551 filed Feb. 16, 2006, now U.S. Pat. No. 7,884,801 issued on Feb. 8, 2011, which is incorporated herein by reference.

TECHNICAL FIELD

The present invention relates generally to signal processing, and more particularly to a signal processing circuit and method for use with an optical navigation system to determine motion of an optical sensor relative to a surface.

BACKGROUND OF THE INVENTION

Signal processing methods are used in a wide range of applications including, for example, measuring an output from a photo-detector of an array in an optical navigation system. Optical navigation systems, such as an optical computer mouse, trackball or touch pad, are well known for inputting data into and interfacing with personal computers and workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse. Alternatively, movement of the hand over a stationary device may be used for the same purpose.

The dominant technology used for optical mice today relies on a light source illuminating a surface, a two-dimensional (2D) array of photosensitive elements to capture the resultant images, and a signal processor that correlates successive images to detect and quantify the motion of the mouse. The image can be produced in a number of ways including illuminating the surface at or near grazing incidence to produce and image shadows due to roughness of the surface, illumination with a coherent light source to produce a speckle image of the surface, or the use of a pattern printed onto the surface itself. Regardless of the imaging method used to produce a trackable image, a processor captures the image and does a series of correlations between successive images to determine the most likely motion between frames. A similar method can be used with a linear sensor to track one dimension (1D) motion. In either case, the correlation used to track the motion of the image requires a great deal of processing and results in an unsatisfactory power consumption that limits the usefulness of the technique in power sensitive applications, such as wireless mice.

An alternative method to correlation uses an array of photosensitive elements or detectors, such as photodiodes, in which the output of the individual elements in the array are combined or wired together in a repeating pattern spanning two or more detectors to track motion along one axis or in one dimension. Generally, the detectors are wired in groups to detect of motion through movement of a light-dark pattern known as speckle. Speckle is the complex interference pattern generated by scattering of coherent light off of an optically rough surface and detected by a photosensitive element, such as a photodiode, with a finite angular field-of-view or numerical aperture. The image mapped to or captured on the comb-array may be magnified or de-magnified to achieve matching and so that the distribution of spatial frequencies in the image is roughly centered around the spatial frequencies of the array. Through use of signal processing, it is possible to track the movement of this image as it moves back and forth across the comb-array and from that tracking derive the motion of the surface relative to the array.

Although a significant improvement over prior art, these speckle-based devices have not been wholly satisfactory for a number of reasons. In particular, optical navigation systems using the above comb-detector array are subject to signal fading from time to time and location to location within the image incident on the array. By fading it is meant that contrast of the received speckle pattern drops below a level that can be accurately detected by the array.—When this happens, the estimation of displacements become erratic and unreliable, hence affecting the overall performance of the optical navigation system.

Accordingly, there is a need for a signal processor or signal processing circuit and method that minimizes the impact of signal fading on the overall performance of the system. It is desirable that the circuit and method achieve this end without increasing the complexity and power consumption of the signal processor or the optical navigation system in which it is used. It is still further desirable that the method reduces the power consumption of the system, thereby making it more suitable for power sensitive applications such as wireless mice.

The present invention provides a solution to this and other problems, and offers further advantages over conventional signal processing methods.

BRIEF DESCRIPTION OF THE DRAWINGS

These and various other features and advantages of the present invention will be apparent upon reading of the following detailed description in conjunction with the accompanying drawings and the appended claims provided below, where:

DETAILED DESCRIPTION

The present invention is directed generally to signal processing, and more particularly, to a signal processing method for use with an optical navigation system for determining motion relative to a surface of an optical sensor including multiple redundant photo-detector arrays, and using contrast-weighted signal averaging.

Optical navigation systems can include, for example, an optical computer mouse, trackballs and the like, and are well known for inputting data into and interfacing with personal computers and workstations. For purposes of clarity, many of the details of optical navigation systems in general and optical sensors for optical navigation systems in particular that are widely known and are not relevant to the present invention have been omitted from the following description. Optical navigation systems and optical sensors are described, for example, in co-pending, commonly assigned U.S. patent application Ser. No. 11/129,967, entitled, "Optical Positioning Device Having Shaped Illumination," filed on May 16, 2005 by Clinton B. Carlisle et al., and incorporated herein by reference in its entirety.

In the following description, for purposes of explanation, numerous specific details are set forth in order to provide a thorough understanding of the present invention. It will be evident, however, to one skilled in the art that the present invention may be practiced without these specific details. In other instances, well-known structures, and techniques are not shown in detail or are shown in block diagram form in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "one embodiment" in various places in the specification do not necessarily all refer to the same embodiment. The term "to couple" as used herein may include both to directly connect and to indirectly connect through one or more intervening components.

Introduction to Speckle-Based Optical Sensors

Operating principles of speckle-based optical sensors will now be described with reference to FIGS. 1 and 2.

Figure 1:
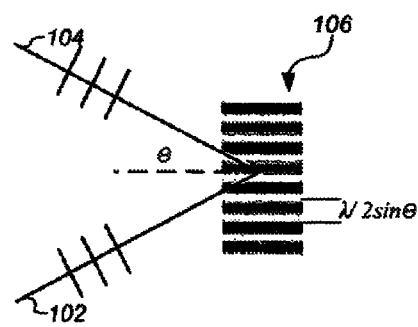
FIG. 1 illustrates a diffraction pattern of light reflected from a surface.

Referring to FIG. 1, laser light of a wavelength indicated is depicted as a first incident wave 102 and a second incident wave 104 to a surface, each making an angle of incidence $\theta$ with respect to the surface normal. A diffraction pattern 106 results which has a periodicity of $\lambda/2 \sin \theta$.

Figure 2:
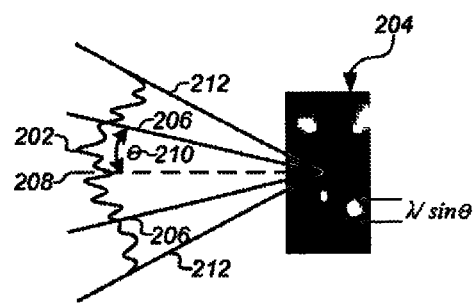
FIG. 2 illustrates a speckle in an interference pattern of light reflected from a rough surface.

In contrast, referring to FIG. 2, any general surface with morphological irregularities of dimensions greater than the wavelength of the incident light (i.e. roughly >1 μm) will tend to scatter light 202 into a complete hemisphere in approximately a Lambertian fashion. If a coherent light source, such as a laser is used, the spatially coherent, scattered light will Create a complex interference pattern 204 upon detection by a square-law detector with finite aperture. This complex interference pattern 204 of light and dark areas is termed speckle. Preferably, as shown in FIG. 2, the main contribution for the measured speckle pattern 204 comes from rays 206 between the surface normal 208 and angle $\theta$ 210, not from the extreme rays 212. Speckle is essentially the random interference pattern generated by scattering of coherent light off of a rough surface and detected by an intensity photosensitive element, such as a photodiode, with a finite angular field-of-view or numerical aperture (NA). The exact nature and contrast of the speckle pattern depends on the surface roughness, the wavelength of light and its degree of spatial-coherence, and the light-gathering or imaging optics of the sensor. Although often highly complex, a speckle pattern is distinctly characteristic of a section of any rough surface that is imaged by the optics and, as such, can be employed to identify a location on the surface as it is displaced transversely to the laser and optics-sensor assembly.

Speckle is expected to come in all sizes up to the spatial frequency set by the effective aperture of the optics, conventionally defined in term of its numerical aperture $NA = \sin \theta$ as shown FIG. 2. Following Goodman [J. W. Goodman, "Statistical Properties of Laser Speckle Patterns" in "Laser Speckle and Related Phenomena" edited by J. C. Dainty, Topics in Applied Physics volume 9, Springer-Verlag (1984)—in particular, see page 39-40.], the size statistical distribution is expressed in terms of the speckle intensity auto-correlation. The "average" speckle diameter is defined as:

$$a = \frac{\lambda}{\sin\theta} = \frac{\lambda}{NA} \quad (1.0)$$

where $\lambda$ is the wavelength of the coherent light, NA is the numerical aperture of the photosensitive element, and $\theta$ is the angle of incidence.

It is interesting to note that the spatial frequency spectral density of the speckle intensity, which by Wiener-Khintchine theorem, is simply the Fourier transform of the intensity auto-correlation. The finest possible speckle, $a_{min} = \lambda/2NA$, is set by the unlikely case where the main contribution comes from the extreme rays 212 of FIG. 2 (i.e. rays at $\pm\theta$), and contributions from most "interior" rays interfere destructively. The cut-off spatial frequency is therefore defined as:

$$f_{co} = 1/(\lambda/2NA) \text{ or } 2NA/\lambda \quad (2.0)$$

Note that the numerical aperture may be different for spatial frequencies in the image along one dimension ("x") than along the orthogonal dimension ("y"). This could be caused, for instance, by an optical aperture which is longer in one dimension than another (for example, an ellipse instead of a circle), or by anamorphic lenses. In these cases the speckle pattern 204 will also be anisotropic, and the average speckle size will be different in the two dimensions.

One advantage of a laser speckle-based optical sensor is that it can operate with illumination light that arrives at near-normal incidence angles. Sensors that employ imaging optics and incoherent light arriving at grazing incident angles to a rough surface also can be employed for transverse displacement sensing. But, since the grazing incidence angle of the illumination is desired to create appropriately large bright-dark shadows of the surface terrain in the image, the system is inherently optically inefficient, as a significant fraction of the light is reflected off in a specular manner away from the sensor and thus contributes nothing to the image formed. In contrast, a speckle-based sensor can make efficient use of a larger fraction of the illumination light from the laser source, thereby enabling the development of an optically efficient displacement sensor.

Optical Navigation Systems

Figure 3:
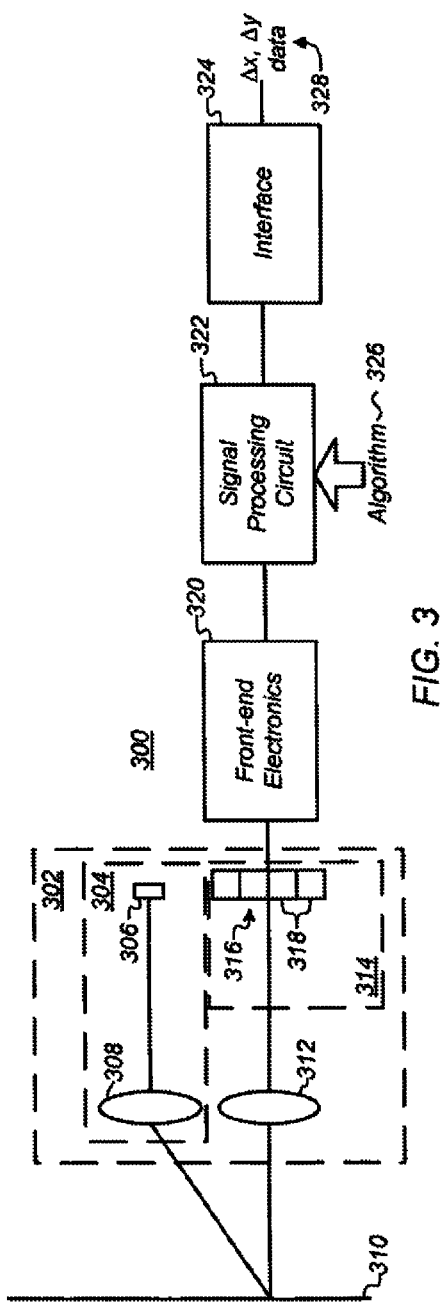
FIG. 3 is a functional block diagram of a speckle-based optical navigation system according to an embodiment of the present invention.

A functional block diagram of one embodiment of an optical navigation system for which the optical sensor and signal processing method of the present invention is particularly useful is shown in FIG. 3. Referring to FIG. 3, an optical navigation system 300 generally includes an optical head 302 having an illuminator 304 with a light source 306 and illumination optics 308 to illuminate a portion of a surface 310, imaging optics 312 to map or image a pattern of the by the surface, and an optical sensor 314 to sense or detect change in the pattern. The optical sensor 314 includes one or more one-dimensional (1D) or two-dimensional (2D) arrays 316 each having a number of photosensitive elements, such as photodiodes 318, on which light reflected from the surface 310 is received. The array(s) 316 may be configured to provide displacement measurements along two orthogonal axes, x and y. The optical navigation system 300 further includes front-end electrics 320, signal processing circuitry 322, and interface circuitry 324. Groups of photodiodes 318 in the array(s) 316 may be combined using passive electronic components in the front-end electrics 320 to produce group signals. These group signals may subsequently algebraically combined by the signal processing circuitry 322 using an algorithm 326 to produce to produce a signal providing information on the magnitude and direction of displacement of the sensor 314 in x and y directions. The signal may be converted by the interface circuitry 324 to produce Δx, Δy data 328 which may be output by the system 300.

Generally, the signal processing method of the present invention is applicable to both speckle and non-speckle based optical sensors having either multiple 1D arrays or 2D arrays. The 2D array may be either a periodic, 2D comb-array, which includes a number of regularly spaced photosensitive elements having 1D or 2D periodicity, a quasi-periodic 2D array (such as one having Penrose tiling), or a non-periodic 2D array, which has a regular pattern but doesn't include periodicities.

Figure 4:
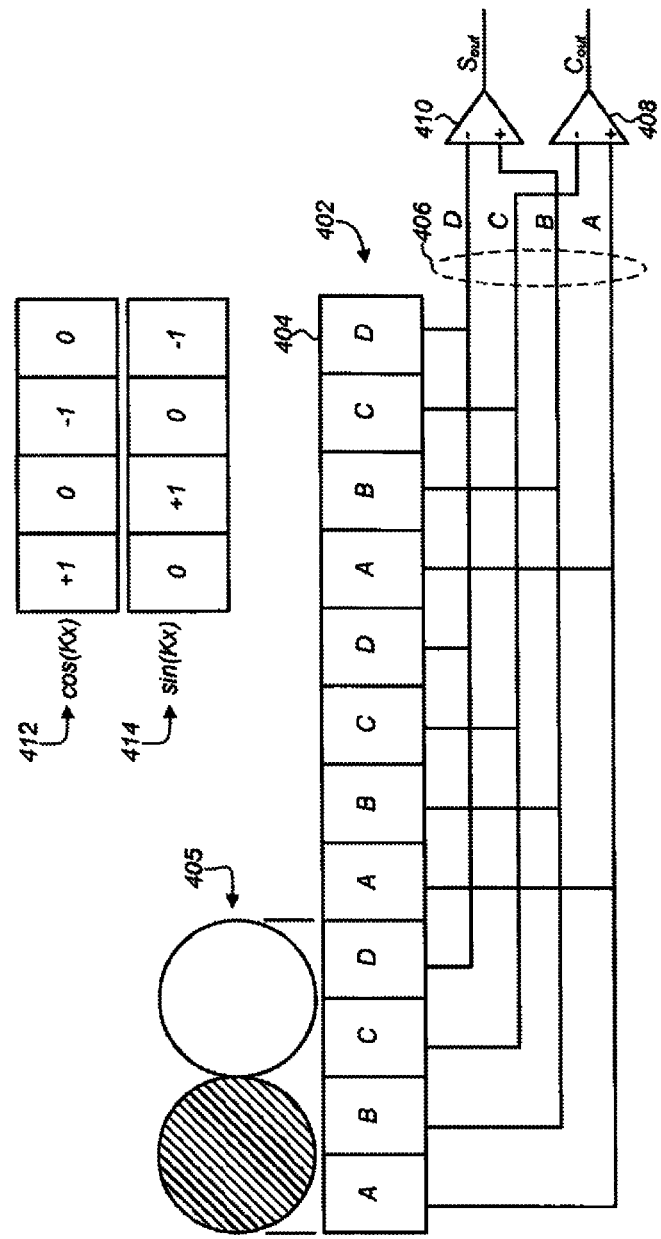
FIG. 4 is a schematic block diagram of a speckle based linear or one-dimensional (1D) comb-array having a four (4) photosensitive elements per period configuration, and for which a signal processing method according to the present invention is useful.

A linear or 1D comb-array is an array having multiple photosensitive elements that are connected in a periodic manner, so the array acts as a fixed template that interrogates one spatial frequency component of the signal. An embodiment of one such 1D comb-array is shown in FIG. 4. The connection of multiple photosensitive elements in a periodic manner enables the comb-array to serve effectively as a correlator at one spatial frequency K (defined by a pitch of the photosensitive elements in the array and the collection optics). FIG. 4 shows a general configuration (along one axis) of a 1D comb-array 402 of photosensitive elements, such as photodiodes 404, wherein the combination of interlaced groups of photosensitive elements serves as a periodic filter on spatial frequencies of light-dark signals 405 produced by the speckle (or non-speckle) images. In the embodiment shown, the 1D comb-array 402 in consists of a number of photodiode sets or periods, each having four of photodiodes 404, labeled here as A, B, C, and D. Currents or signals from corresponding or similarly labeled photodiodes 404 in each period are electrically connected (wired sum) to form four line signals 406 coming out from the array 402. Background suppression and signal accentuation is accomplished by using differential analog circuitry 408 to generate an in-phase differential current signal, labeled here as $C_{out}$, and differential analog circuitry 410 to generate a quadrature differential current signal, labeled here as $S_{out}$. Comparing the phase of the in-phase and quadrature signals permits determination of the magnitude and direction of motion of the 1D comb-array 402 relative to a scattering surface.

Referring to FIG. 4, the in-phase $C_{out}$ and the quadrature $S_{out}$ signals are obtained by taking the underlying speckle pattern and processing them according to the cosine and sine templates, 412 and 414 respectively. Preferably, the system is designed so that an optical "light-dark" signal pattern, i.e., speckle, has a size substantially equal to the period of the comb-array—four (4) photodiodes 404 or pixels in the embodiment of FIG. 4. The in-phase signal current is obtained from $C_{out}$=A−C, and the quadrature signal current from $S_{out}$=B−D as shown in FIG. 4.

Figure 5:
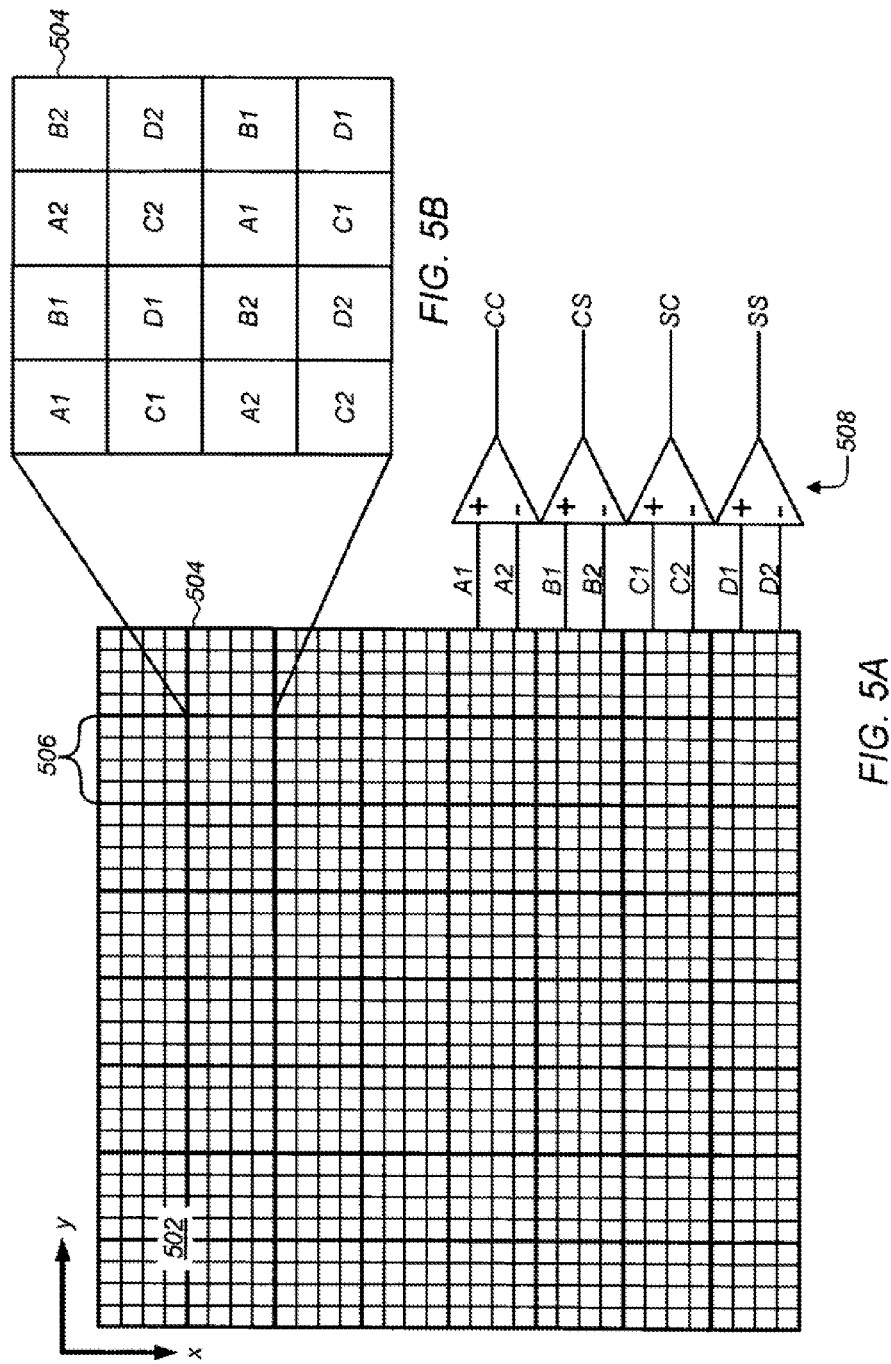
FIGS. 5A and 5B are schematic block diagrams of a 2D comb-array having photosensitive elements grouped in a 4×4 elements-per-cell configuration according to an embodiment of the present invention.

In a preferred embodiment the optical sensor includes the detectors or photosensitive elements are arrayed in two dimensions (2D), as shown in FIGS. 5A and 5B. The performance of the 2D comb-array is expected to be superior to the 1D×1D case since each point in the image, in the average, traverses a much longer path inside the 2D detector active area in all directions and therefore contributes more to the displacement estimation. FIGS. 5A and 5B are schematic block diagrams of a 2D comb-array having photosensitive elements grouped in a 4×4 elements-per-cell configuration. Referring to FIGS. 5A and 5B, the 2D comb-array 502 has multiple photosensitive elements 504 arranged or grouped into cells 506, each cell having photosensitive elements grouped in a 4×4 elements-per-cell (or 4×4 elements/period) configuration. Photosensitive elements 504 within a cell 506 with the same letter and same number, as shown in the detail of FIG. 5B, as well as corresponding elements of all cells in the 2D comb-array 502 with the same number, are electrically connected or wired-sum to yield eight signals A1 through D2. The eight wired-sum signals are further combined with differential amplifiers 508 to provide four signals containing the in-phase and quadrature information in the x and y directions.

Figure 6:
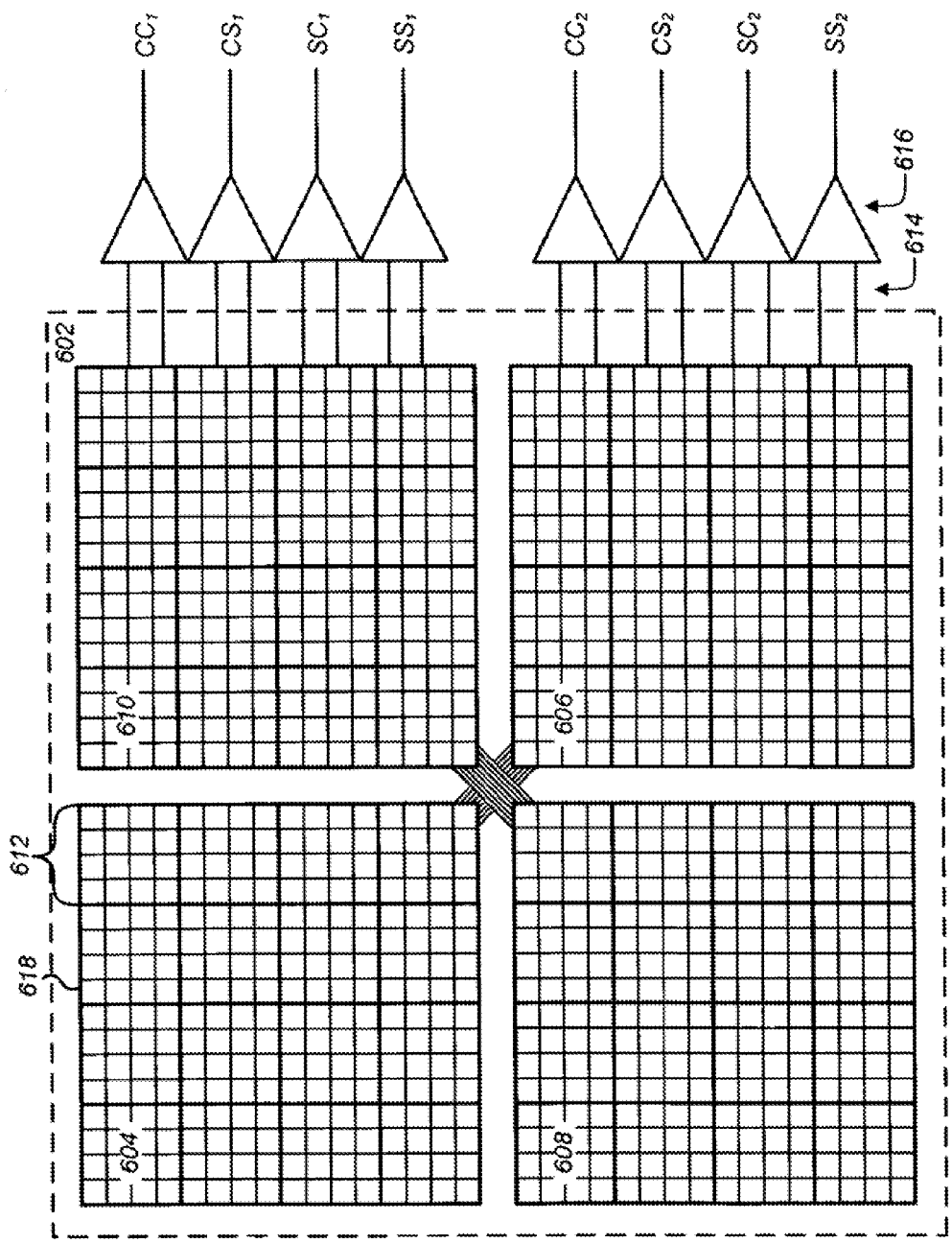
FIG. 6 is a schematic block diagram of an optical sensor having multiple 2D comb-arrays arranged in quadrants, and for which a signal processing method according to the present invention is useful.

Preferably, the optical sensor includes multiple 1D or 2D comb-array or sub-arrays to mitigate the effect of signal fading on motion detection. More preferably, the optical sensor includes multiple 2D comb-array or sub-arrays of a given spatial frequency or different spatial frequencies. For example, FIG. 6 shows a schematic block diagram of an optical sensor 602 having two 2D comb-array pairs arranged in quadrants 604, 606, 608 and 610 according to an embodiment of the present invention. Diagonally opposing quadrants 604 and 606 are connected and form a first single array-pair or first 2D comb-array. Opposing quadrants 608 and 610 are connected and form a second single array-pair or second 2D comb-array.

As in the examples described above, elements within each cell 612 in a quadrant 604, 606, 608 and 610 as well as corresponding elements of all cells in the array-pair are coupled to form sixteen (16) wired-sum signals 614. The 16 wired-sum signals 614 are further combined with differential amplifiers 616 to produce eight (8) signals, CC1, CS1, SC1, SS1 from the first 2D comb-array, and CC2, CS2, SC2, SS2 from the second 2D comb-array. In operation, the strengths of the signals from either of the 2D comb-arrays or array-pairs may decrease because the selected spatial frequency component is weak at some particular location on the surface, or because contributions from various parts of the array add coherently to zero. However, it will be appreciated that fading in any one array-pair is unlikely to result in fading in the other pair, therefore such a multiple array or sub-array configuration is often desirable to mitigate signal fading. Moreover, the square symmetry arrangement of the optical sensor 602 enables simple and efficient illumination of all photosensitive elements 618 in the optical sensor.

Although the detector or photosensitive elements shown in FIGS. 5A, 5B and 6 are equal in size and square, it will be understood that this is a particular embodiment of a 2D array which is not necessary to practice the invention.

Signal Processing

A signal processing method according to the present invention will now be described in detail with reference to FIGS. 5A, 5B, 6 and 7.

The image captured on the 2D comb-array of FIGS. 5A and 5B is (de)-magnified such that the spatial frequency distribution of the image is roughly centered around the spatial frequency of the detector array. Through the processing of the four quasi-sinusoidal outputs (CC, CS, SC, and SS) representing separate in-phase and quadrature signals for motion along two orthogonal axes, it is possible to track the 2D movement of the image as it moves across the detector array and derive the motion of the surface relative to the detector array along the two orthogonal axes. For a 2D motion, the phase angle value in an x direction, $\theta_x$, can be computed similarly using equation 3.0 shown below.

$$\phi_x = \tan^{-1}\left(\frac{Q}{I}\right) = \tan^{-1}\left(\frac{CS + SC}{CC - SS}\right) \quad (3.0)$$

where $\theta_x$ is the phase angle value in the x direction, and CC, CS, SC, and SS are the four quasi-sinusoidal output signals from the array shown in FIG. 5A and described above.

The phase angle value in a y direction, $\theta_y$, can be computed similarly using equation 4.0 shown below.

$$\phi_y = \tan^{-1}\left(\frac{CS - SC}{CC + SS}\right) \quad (4.0)$$

The velocity of the movement of the sensor relative to the surface can now be determined by tracking the phase angle changes over time, that is from frame to frame using the following equation:

$$\text{Velocity} = \left(\frac{\Delta\phi}{\Delta t}\right) \quad (5.0)$$

The phase angle changes $\Delta\theta_x$ and $\Delta\theta_y$ represent the movement of an image across the detector in 2D. For the 2D comb-array shown in FIGS. 5A and 5B, the phase angle changes $\Delta\theta_x$ and $\Delta\theta_y$ from the previous sample frame are proportional to the detected 2D displacements along the two orthogonal axes between the current and previous sample frames. Note also, because $\Delta t$ or the sampling rate is constant velocity is proportional to $\Delta\theta$. Accordingly, the terms velocity and $\Delta\theta$ are used interchangeably throughout the remainder of this description.

Optionally, at each sample frame radius values $R_x$ and $R_y$ are computed as well as phase angle values $\theta_x$ and $\theta_y$ using the following equations:

$$R_x = \sqrt{(CC-SS)^2 + (CS+SC)^2} \quad (6.0)$$

$$R_y = \sqrt{(CC+SS)^2 + (CS-SC)^2} \quad (7.0)$$

$R_x$ and $R_y$ indicate the contrast of the detected quasi-sinusoidal signals, and can be used as weighting factors in average velocity calculations and/or as an indication of quality of the received signal.

At each sample frame, phase angle values $\theta_x$ and $\theta_y$ as well as radius values $R_x$ and $R_y$ are computed. $R_x$ and $R_y$ indicate the contrast of the detected quasi-sinusoidal signals. The phase angle changes $\Delta\theta_x$ and $\Delta\theta_y$ from the previous sample frame are proportional to the 2D displacements along the two orthogonal axes between the current and previous sample frames. $\Delta\theta_x$ and $\Delta\theta_y$ are computed from the phase angle values for two successive frames using the following equations:

$$\Delta\phi_x = \phi_{x,i} - \phi_{x,i-1} \text{ where } \phi_{x,i} = \tan^{-1}\left(\frac{CS_i + SC_i}{CC_i - SS_i}\right) \quad (8.0)$$

$$\Delta\phi_y = \phi_{y,i} - \phi_{y,i-1} \text{ where } \phi_{y,i} = \tan^{-1}\left(\frac{CS_i - SC_i}{CC_i + SS_i}\right) \quad (9.0)$$

Due to the mathematical nature of the inverse tangent function (i.e., $\tan(\theta)=\tan(\theta+2\pi N)$), where N is a whole number greater than or equal to 1, the computed phase angles $\theta_x$ and $\theta_y$ are always wrapped within the range of $[-\pi, +\pi]$. Thus, to compute the correct 2D displacements ($\Delta\Phi_x$ and $\Delta\Phi_y$) between two successive frames, the phase angle changes $\Delta\theta_x$ and $\Delta\theta_y$ need to be unwrapped to account for any additional full $2\pi$ rotations that may have occurred between the two sample frames.

Phase Unwrapping Using Velocity Predictor

In a preferred embodiment unwrapping is accomplished using a velocity predictor as described, for example, in co-pending, commonly assigned U.S. patent application Ser. No. 11/129,967, entitled, "Method For Determining Motion Using A Velocity Predictor," filed on Jan. 3, 2006 by Yansun Xu et al., and incorporated herein by reference in its entirety.

Preferably, the velocity predictors are computed using average velocity values (unwrapped average phase angle changes) from K preceding successive frames by: (i) calculating the number of full $2\pi$ rotations needed to unwrap the phase angle changes for each direction using the velocity predictors; and (ii) computing the unwrapped or corrected phase angle changes. This correction or unwrapping is expressed mathematically in the following equations:

$$\Delta\Phi_x = \Delta\phi_x - 2\pi \times \text{INTEGER}\left(\frac{\Delta\phi_x - \langle\Delta\Phi_x\rangle + \pi}{2\pi}\right) \quad (10.0)$$

$$\Delta\Phi_y = \Delta\phi_y - 2\pi \times \text{INTEGER}\left(\frac{\Delta\phi_y - \langle\Delta\Phi_y\rangle + \pi}{2\pi}\right) \quad (11.0)$$

where the INTEGER function takes the largest integer value that is not greater than its argument, and $\langle\Delta\Phi_x\rangle$ and $\langle\Delta\Phi_y\rangle$ are the average phase angle changes (unwrapped) along the X and Y axes between two successive frames (i.e., the average velocities) over the past K frames. The average velocities, also known as velocity predictors, are expressed mathematically in the following equations:

$$\langle\Delta\Phi_x\rangle = \frac{1}{K}\sum_{j=1}^{K}\Delta\Phi_{x,(i-j)} \quad (12.0)$$

$$\langle\Delta\Phi_y\rangle = \frac{1}{K}\sum_{j=1}^{K}\Delta\Phi_{y,(i-j)} \quad (13.0)$$

The unwrapped or corrected phase angle changes for each direction are then combined to determine the movement of an image across the detector in two dimensions.

Combining Multiple Comb-Arrays

In accordance with the present invention, preferably the optical sensor includes multiple 1D or 2D comb-arrays placed at different locations of the imaging spot or area of the optical sensor illuminated by light reflected from the surface relative to which the sensor is moved. Motion data derived from the two or more comb-arrays is then combined to produce a single signal in which the effect of signal fading on motion detection is mitigated.

Figure 7:
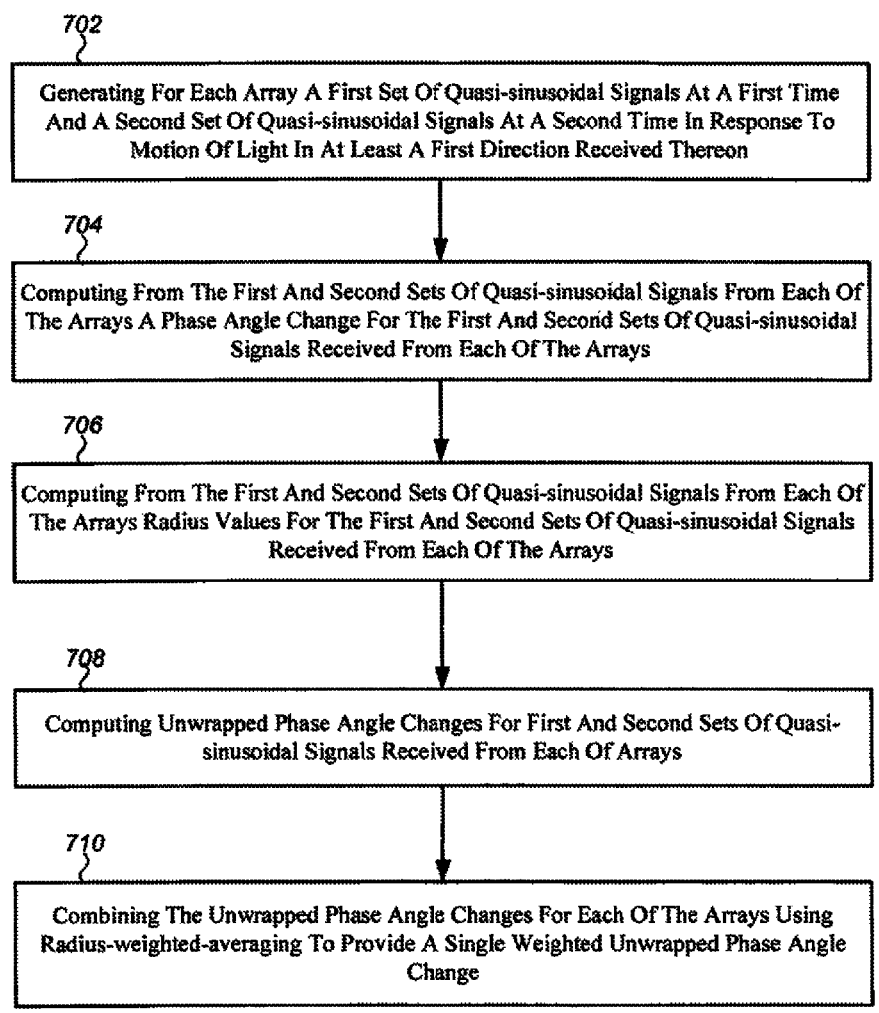
FIG. 7 is a flowchart of a signal processing method according to an embodiment of the present invention.

A flowchart of a method for detecting motion of an optical sensor relative to a surface using multiple comb-arrays, including a step of combining the unwrapped phase angle changes ($\Delta\Phi_{x1}$, $\Delta\Phi_{x2}$) for each of the arrays using radius-weighted-averaging according to an embodiment of the present invention, is shown FIG. 7. Briefly, the method involves: (i) generating for each array a first set of quasi-sinusoidal signals (CC, CS, SC, and SS) at a first time and a second set of quasi-sinusoidal signals at a second time in response to motion of light received thereon in at least a first direction (x) (702); (ii) computing from the first and second sets of quasi-sinusoidal signals from each of the arrays a phase angle change ($\Delta\theta_{x1}$, $\Delta\theta_{x2}$) for the first and second sets of quasi-sinusoidal signals received from each of the arrays (704); (iii) computing from the first and second sets of quasi-sinusoidal signals from each of the arrays radius values ($R_{x1}$, $R_{x2}$) for the first and second sets of quasi-sinusoidal signals received from each of the arrays (706); (iv) computing unwrapped phase angle changes ($\Delta\Phi_{x1}$, $\Delta\Phi_{x2}$) for the first and second sets of quasi-sinusoidal signals received from each of the arrays (708); combining the unwrapped phase angle changes ($\Delta\Phi_{x1}$, $\Delta\Phi_{x2}$) for each of the arrays using radius-weighted-averaging to provide a single weighted average unwrapped phase angle change ($\Delta\Phi_x$) resulting from the motion in the first direction (710).

A signal processing method to combine the motion data derived from the arrays according to one embodiment of the present invention will now be described in detail. Generally, the method involves using the radius values as weighting coefficients when combining the motion data derived from the two detector arrays.

In particular, $\Delta\Phi_{x1}$ and $\Delta\Phi_{y1}$ are the corrected (unwrapped) phase angle changes between two successive frames for a first comb-array (array #1), and $\Delta\Phi_{x2}$ and $\Delta\Phi_{y2}$ for a second comb-array (array #2), the estimated 2D displacements, $\Delta\Phi_x$ and $\Delta\Phi_y$, for the multi-detector-array system shall be derived from some combination of $\Delta\Phi_{x1}$ and $\Delta\Phi_{x2}$, and of $\Delta\Phi_{y1}$ and $\Delta\Phi_{y2}$. We know that the radius data, $R_x$ and $R_y$, derived from the quasi-sinusoidal signals (CC, CS, SC and SS) are good indicators of speckle signal contrast or strength. A small radius value indicates low speckle contrast, i.e., the signal is fading. By using the radius values as weighting coefficients when combining the motion data derived from the two detector arrays, we can effectively reduce the impact of an erratic phase calculation due to signal fading on the final 2D displacement estimation. The following equations use the radius-weighted averages to combine displacement estimations derived from two detector arrays, where $R_{x1}$ and $R_{y1}$ are the radius data from array #1, and $R_{x2}$ and $R_{y2}$ are the radius data from array #2. Thus, a weighted average phase angle changes between two successive frames can be expressed mathematically in the following equations:

$$\Delta\Phi_x = \frac{R_{x1} \times \Delta\Phi_{x1} + R_{x2} \times \Delta\Phi_{x2}}{R_{x1} + R_{x2}} \quad (14.0)$$

$$\Delta\Phi_y = \frac{R_{y1} \times \Delta\Phi_{y1} + R_{y2} \times \Delta\Phi_{y2}}{R_{y1} + R_{y2}} \quad (15.0)$$

However, it has been found that the above weighted-average approach does not yield the optimum estimation when radius values from both detector arrays are very small and/or the phase angle changes are very small, i.e., when motion is very slow. By very slow it is meant a motion of about 1 mm/S or less. Thus in another embodiment, in these extreme situations the un-weighted average can be used to estimate the 2D displacements as follows:

$$\Delta\Phi_x = \frac{\Delta\Phi_{x1} + \Delta\Phi_{x2}}{2} \quad (16.0)$$

$$\Delta\Phi_y = \frac{\Delta\Phi_{y1} + \Delta\Phi_{y2}}{2} \quad (17.0)$$

Recall that "velocity predictors" are used to compute the corrected (unwrapped) phase angle changes of $\Delta\Phi_{x1}$, $\Delta\Phi_{y1}$ and $\Delta\Phi_{x2}$, $\Delta\Phi_{y2}$ from two individual arrays. Recall also that the "velocity predictors" are estimated as the mean phase angle changes between two successive frames over the past K frames. Thus, it is also desirable to use phase angle changes from both arrays when computing the "velocity predictors". The velocity predictors calculated using phase angle changes from both arrays can be expressed mathematically in the following equations:

$$\langle \Delta\Phi_x \rangle = \frac{1}{2K} \sum_{j=1}^{K} [\Delta\Phi_{x1,(i-j)} + \Delta\Phi_{x2,(i-j)}] \quad (18.0)$$

$$\langle \Delta\Phi_y \rangle = \frac{1}{2K} \sum_{j=1}^{K} [\Delta\Phi_{y1,(i-j)} + \Delta\Phi_{y2,(i-j)}] \quad (19.0)$$

In yet another embodiment, the accuracy of these velocity predictors can be further improved with the use of "radius-weighting". There are two approaches to accomplish this radius weighting. The first approach can be expressed mathematically in the following equations:

$$\langle \Delta\Phi_x \rangle = \frac{\sum_{j=1}^{K} [R_{x1,(i-j)} \times \Delta\Phi_{x1,(i-j)} + R_{x2,(i-j)} \times \Delta\Phi_{x2,(i-j)}]}{\sum_{j=1}^{K} [R_{x1,(i-j)} + R_{x2,(i-j)}]} \quad (20.0)$$

$$\langle \Delta\Phi_y \rangle = \frac{\sum_{j=1}^{K} [R_{y1,(i-j)} \times \Delta\Phi_{y1,(i-j)} + R_{y2,(i-j)} \times \Delta\Phi_{y2,(i-j)}]}{\sum_{j=1}^{K} [R_{y1,(i-j)} + R_{y1,(i-j)}]} \quad (21.0)$$

In this approach, the $\Delta\Phi_x$ and $\Delta\Phi_y$ values for each frame and each array are all averaged together and weighted by the radius value for the corresponding array and sample frame. This means that frames with small radii for both arrays will be given less weight than the frames with strong radii for both arrays.

In yet another embodiment radius weighting can be accomplished in second approach, which is expressed mathematically in the following equations:

$$\langle \Delta\Phi_x \rangle = \frac{1}{K} \sum_{j=1}^{K} \frac{R_{x1,(i-j)} \times \Delta\Phi_{x1,(i-j)} + R_{x2,(i-j)} \times \Delta\Phi_{x2,(i-j)}}{R_{x1,(i-j)} + R_{x2,(i-j)}} \quad (22.0)$$

-continued $$\langle \Delta\Phi_y \rangle = \frac{1}{K} \sum_{j=1}^{K} \frac{R_{y1,(i-j)} \times \Delta\Phi_{y1,(i-j)} + R_{y2,(i-j)} \times \Delta\Phi_{y2,(i-j)}}{R_{y1,(i-j)} + R_{y1,(i-j)}} \quad (23.0)$$

In this approach, the $\Delta\Phi_x$ and $\Delta\Phi_y$ values within each sample frame are weighted over both arrays first to produce a delta phase for the frame, then averaged (un-weighted) over K frames. Unlike the first approach, all sample frames are given an equal weighting here since the radius information is lost after calculating the combined $\Delta\Phi_x$ and $\Delta\Phi_y$ values (weighted over both arrays) for each frame.

In summary, the advantages of the signal averaging circuit and method of the present invention over previous or conventional circuits and methods include improved accuracy of a phase angle unwrapping algorithm employed in quasi-sinusoidal signal processing, and hence the performance of the motion tracking by comb-array(s) without imposing additional limitations on the detectable speed of the motion. The method also enables fairly accurate detection of very high-speed motion (i.e., greater than 20 inch/second) with limited data sampling rate (i.e., less than 40 kHz). This last advantage is particularly desirable in applications, such as wireless optical mice, where the sampling rate is limited due to certain power consumption budget.

The advantages of the signal averaging circuit and method of the present invention over previous or conventional circuits and methods will now be illustrated in more detail with reference to FIGS. 8A to 8C, and 9.

Results of Prototype Testing

Figure 8A:
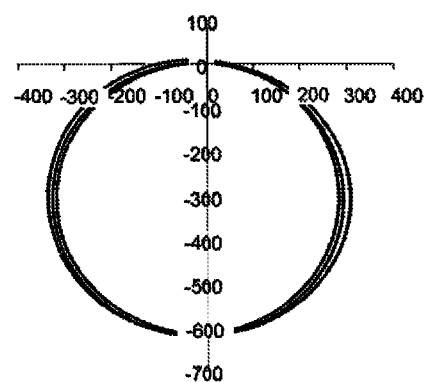
FIGS. 8A to 8C are graphs of circular trajectories at a low speed of 1 cm/s for an optical navigation system over a surface detected by a signal processing method according to an embodiment of the present invention (using single comb-array for motion detection versus using redundant comb-arrays for more accurate motion detection)
Figure 8B:
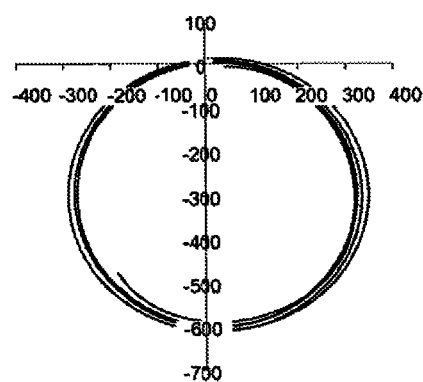
Figure 8C:
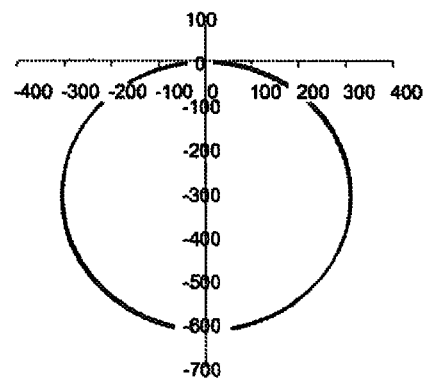
Figure 9:
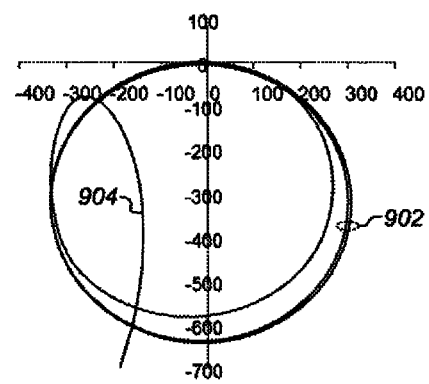
FIG. 9 shows graphs of circular trajectories at a high speed of 40 cm/s for an optical navigation system over a surface using un-weighted versus contrast-weighted signal averaging according to an embodiment of the present invention.

FIGS. 8A to 8C show traces of 1 cm/s circular motion of 1 cm radius detected using 2D comb-arrays similar to that described above with reference to FIG. 6. In particular, FIGS. 8A and 8B show traces of 1 cm/s circular motion of 1 cm radius detected using signals from only comb-array #1 and only comb-array #2 of the two comb-arrays, and FIG. 8C shows traces using signals from both comb-arrays with the contrast-weighted averaging over motion data derived from each comb-array. Referring to FIGS. 8A and 8B, it is seen that when signals from a single comb-array are used the traces show some degree of drift due to speckle signal fading. The circle traces in FIG. 8C in contrast show substantially no drift since the motion data from two individual comb-arrays are combined with signal-contrast weighting. FIG. 9 shows traces of 40 cm/s circular motion of 1 cm radius using two 2D comb-arrays with and without the use of contrast-weighted signal averaging. In particular, the circular trace identified by the reference numeral 902 show trace of a 40 cm/s fast circular motion of 1 cm radius detected with two comb-arrays by combining the motion data from each individual comb-array using contrast-weighted averaging. The trace identified by the reference numeral 904 shows motion detected with two comb-arrays with un-weighted (direct) averaging. Referring to FIG. 9, it is seen that contrast-weighted averaging method effectively reduces the errors in motion detection and estimation caused by signal fading. Without the contrast weighting, the errors due to signal fading can be large enough to make detected motion trace go in a completely wrong direction. The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. A method comprising:
    generating for a first group of photosensitive elements a first quasi-sinusoidal signal at a first time, and a second quasi-sinusoidal signal at a second time in response to motion of light received thereon in a first direction;
    computing from the first and second quasi-sinusoidal signals a phase angle change;
    computing from the first and second quasi-sinusoidal signals a radius value;
    generating for a second group of photosensitive elements a third quasi-sinusoidal signal at the first time, and at the second time a fourth quasi-sinusoidal signal in response to the motion of the light received thereon in the first direction;
    computing from the third and fourth quasi-sinusoidal signals another phase angle change;
    computing from the third and fourth quasi-sinusoidal signals another radius value; and
    combining phase angle changes using radius-weighted-averaging to provide a single weighted average phase angle change resulting from the motion of the light in the first direction.

2. The method of claim 1, wherein the first and second groups of photosensitive elements are positioned at different locations within a two dimensional (2D) array of photosensitive elements.

3. The method of claim 1, wherein generating quasi-sinusoidal signals for the first and second groups of photosensitive elements further comprises generating for each group of photosensitive elements quasi-sinusoidal signals at the first and second time in response to motion of light in a second direction.

4. A method comprising:
    generating for a first group of photosensitive elements a first quasi-sinusoidal signal at a first time, and a second quasi-sinusoidal signal at a second time in response to motion of light received thereon in a first direction;
    generating for a second group of photosensitive elements a third quasi-sinusoidal signal at the first time, and at the second time a fourth quasi-sinusoidal signal in response to motion of light received thereon in the first direction;
    computing from the first and second quasi-sinusoidal signals a first phase angle change,
    and from the third and fourth quasi-sinusoidal signals a second phase angle change; and
    combining the first and second phase angle changes to provide a single average phase angle change resulting from the motion in the first direction.

5. The method of claim 4, further comprising computing a signal strength value of the quasi-sinusoidal signals computing from the first and second quasi-sinusoidal signals a first radius value, and from the third and fourth quasi-sinusoidal signals a second radius value.

6. The method of claim 5, wherein combining the first and second phase angle changes comprises combining the first and second phase angle changes using radius-weighted averaging to provide a single weighted average phase angle change.

7. The method of claim 4, wherein the first and second groups of photosensitive elements are positioned at different locations within a two dimensional (2D) array of photosensitive elements.

8. The method of claim 4, wherein the first and second groups of photosensitive elements are positioned at within two different arrays of photosensitive elements.

9. The method of claim 4, wherein generating quasi-sinusoidal signals for the first and second groups of photosensitive elements further comprises generating for each group of photosensitive elements quasi-sinusoidal signals at the first and second time in response to motion of light in a second direction.

* * * * *